Patented Oct. 2, 1951

2,570,020

UNITED STATES PATENT OFFICE 2,570,020

LOW-EXPANSION LEAD-BOROSILICATE GLASS OF HIGH CHEMICAL DURABILITY

William H. Armistead, Corning, N. Y., assignor to Corning Glass Works, Corning, N. Y., a corporation of New York No Drawing. Application July 13, 1949,
Serial No. 104,602

4 Claims. (Cl. 106—53)

This invention relates to low-expansion lead-borosilicate glasses which are particularly suitable for use in the manufacture of glass parts for fabrication into electronic devices such as cathode ray tubes, luminous discharge lamps and the like.

To be suitable for such purpose, a glass should possess a relatively low expansion coefficient, not too long a working range with as low a softening point as possible, and a chemical durability and stability that permit the satisfactory fabrication of such devices and their ultimate use under customary operating conditions. In particular, the glass parts of which these devices are fabricated should be able to withstand without subsequent deterioration the elevated temperatures required in the various manipulations and treatments to which they are subjected.

A relatively low expansion coefficient is necessary in order to obtain a satisfactory seal between the glass and the metals used for the leads. Tungsten or molybdenum is generally employed for this purpose, and the expansion coefficient of the glass should accordingly range from about $32 \times 10^{-7}$ to about $40 \times 10^{-7}$ cm. per cm. per °C. between 0° and 300° C.

The working range, that is, the temperature interval through which the glass is sufficiently plastic for working, should be reasonably short in order to facilitate mechanical working of the glass; and the softening point should be sufficiently low that excessive temperatures are not required for working the glass. (As is well known, a convenient indication of the working range of a glass is the difference between its softening point and its strain point, for a description of the determination of which reference should be had to H. R. Lillie's article entitled "Viscosity of Glass between the Strain Point and Melting Temperature," in the "Journal of the American Ceramic Society," vol. 14, pages 502–511 (1931).) Desirably, the difference between the softening point and the strain point should be less than 300° C. and preferably less than 290° C., the softening point of the glass itself being less than 770° C. and preferably less than 760° C.

The glass parts out of which these devices are fabricated are necessarily manipulated and treated at relatively high temperatures, not only in the formation thereof but also in the sealing thereof together, in the sealing of the leads thereinto, and in the subsequent annealing thereof. In most of these operations the glass parts are subjected to the high temperatures for a more or less extended time; and the glass should be sufficiently chemically and thermally durable and stable to withstand such manipulation and treatment without any substantial adverse effect. More particularly, the glass should possess a sufficient chemical durability that it continues to satisfactorily resist the solvent effect of water and other aqueous media, such as acidic media. This characteristic is especially requisite in glass to be utilized in the fabrication of television tubes, in the face panel of which in particular weathering of the glass is most undesirable and prevents formation of a satisfactory screen thereon.

The chemical durability of a glass can be conveniently expressed arbitrarily as the loss in weight in milligrams per square centimeter of a small polished plate of the glass after immersion for 24 hours in 5% aqueous HCl at 100° C., the plate having been heated for six hours at approximately the annealing temperature of the glass prior to being polished. The greater the loss in weight, the poorer will be the chemical durability of the glass. For present purposes it is particularly desirable that such loss should not exceed 0.15 mg. per sq. cm.

There have been available heretofore various glasses possessing some but not all of these several characteristics. Typical of these are certain soda-lead-borosilicate glasses that have been employed for the purposes set forth above, but not with entire satisfaction. While such prior soda-lead-borosilicate glasses are generally suitable otherwise, their chemical durability, amounting to a loss in weight of 4 to 6 mg. per sq. cm., is relatively low. In common with some other known alkali borosilicates, they tend to be thermally unstable; that is, after being heated for an appreciable time at temperatures in their annealing ranges, such glasses become particularly susceptible to the solvent effects of aqueous solutions, especially such solutions containing acids. In other words, the chemical or acid durability of such borosilicate glasses is substantially lowered by prolonged heat treatment at temperatures in the neighborhood of their annealing points.

For relatively small articles requiring little or no heat treatment, such prior soda-lead-borosilicate glasses have been generally used in the absence of a better glass. In the manufacture of television tubes requiring the separate formation of the face plate and the funnel with the subsequent fusion welding thereof, wherein not only a final but several intermediate annealing heat treatments are necessary, however these prior glasses weather so badly that a satisfactory tube cannot be produced therefrom.

This deficiency of these prior glasses has now been overcome and the chemical durability thereof has been surprisingly increased by as much as a hundredfold and more by substituting wholly or in part certain critical proportions of $K_2O$ and $Li_2O$ for the $Na_2O$ present therein. Glasses have thus been produced which individually have all of the aforesaid desirable properties and which are particularly suitable for the fabrication of large cathode ray tubes unusually resistant to weathering.

The new glasses comprise essentially 68% to 76% $SiO_2$, 10% to 19% $B_2O_3$, 2% to 12% PbO, 0.1% to 1% $Li_2O$, 1% to 5% $K_2O$, 0% to 3% $Na_2O$, and 0.5% to 3% $Al_2O_3$, the total of the alkali metal oxides being between 3% and 6%, the total $B_2O_3$ and PbO being between 15% and 26%, and the total of the essential constituents being at least 94% and preferably more than 97%. Although $Na_2O$ may be entirely absent, it may be present if desired in amounts up to 3% of the total composition.

Only the indicated critical and relatively narrow ranges of proportions result in glasses having all the desired characteristics. While other metallic oxides commonly used in making glass may be present, if desired, the total amount of such non-essential oxides should not exceed about 3% but in some instances may be as much as 5% to 6% of the total composition. Such metallic oxides include oxides of arsenic, antimony, beryllium, magnesium, calcium, zinc, strontium, cadmium and barium. Generally, not more than about 2% of either arsenic oxide or antimony oxide, both of which serve as fining agents, need be employed; and not more than a total of 3% of the indicated second group oxides should be present in order to avoid any opalizing tendency in the glass although, when either zinc oxide or barium oxide is present, the total amount of these oxides may be somewhat greater. Oxides of titanium, zirconium and thorium, if present, should not exceed a total of about 2%.

Variations in the proportions of the essential constituents of the present glasses, namely, $SiO_2$, $B_2O_3$, PbO, $Li_2O$, $K_2O$, and $Al_2O_3$, should be confined within the limits set forth above for the following reasons:

The chemical durability of the glass is lowered objectionably by an excess of $B_2O_3$, or by a deficiency of one or more of the constituents $SiO_2$ or PbO or $Li_2O$ or $K_2O$ or $Al_2O_3$. On the other hand, the softening point of the glass becomes too high with a deficiency of either or both $B_2O_3$ or $Li_2O$ or with an excess of one or more of the constituents $SiO_2$ or $K_2O$ or $Al_2O_3$. An excess of $Al_2O_3$ or a deficiency of PbO tends to lengthen the working range of the glass objectionably.

Devitrification of the glass during working may occur if the percentage of $SiO_2$ or PbO or both is excessive or if the percentage of $B_2O_3$ or $Al_2O_3$ or both is too small. Moreover, in order to avoid devitrification tendencies it is essential that the sum total of the percentages of $B_2O_3$ and PbO be not less than 15%; if such total exceeds 26%, however, the chemical durability is lowered objectionably.

The expansion coefficient of the glass becomes objectionably high if the total $Li_2O$, $Na_2O$ and $K_2O$ content exceeds 6%, and the glass becomes objectionably viscous and prone to devitrification if such total alkali metal oxide content is below 3%.

Halogen compounds preferably should be absent from the batch because lead halides tend to evaporate at glass-melting temperatures, thus causing loss of lead; and even at temperatures in the working range lead halides form objectionable condensates on mold surfaces.

For illustrating but not limiting the invention, the following compositions in percent by weight on the oxide basis as calculated from their batches are given together with their properties:

| | 1 | 2 | 3 | 4 | 5 | 6 | 7 |
|---|---|---|---|---|---|---|---|
| $SiO_2$ | 70 | 70 | 70 | 70 | 71.7 | 73.4 | 70 |
| $B_2O_3$ | 17 | 17 | 17 | 19 | 15 | 13 | 15 |
| PbO | 6 | 6 | 6 | 4 | 6 | 6 | 8 |
| $Li_2O$ | 0.25 | 0.25 | 0.25 | 0.25 | 0.25 | 0.5 | 0.25 |
| $K_2O$ | 3.75 | 3.25 | 2.75 | 2.75 | 3.05 | 1.1 | 2.75 |
| $Na_2O$ | | 0.5 | 1 | 1 | 1 | 3 | 1 |
| $Al_2O_3$ | 2 | 2 | 2 | 2 | 2 | 2 | 2 |
| $As_2O_3$ | 1 | 1 | 1 | 1 | 1 | 1 | 1 |
| Softening pt., °C | 750 | 744 | 739 | 747 | 759 | 744 | 745 |
| Softening pt. minus strain pt., °C | 287 | 280 | 272 | 294 | 291 | 262 | 275 |
| Exp. Coeff. $\times 10^7$ cm./cm./°C | 36.0 | 36.5 | 36.4 | 35.4 | 35.9 | 38.6 | 36.5 |
| Chemical durability, loss in weight, mg./sq. cm.[1] | 0.05 | 0.03 | 0.07 | 0.11 | 0.03 | 0.15 | 0.07 |

[1] In the determination of the loss in weight, small plates of the glasses were heated for six hours at 510° C., the average annealing temperature thereof, after which they were polished and then immersed for 24 hours in 5% aqueous HCl at 100° C.

| | 8 | 9 | 10 | 11 | 12 | 13 | 14 |
|---|---|---|---|---|---|---|---|
| $SiO_2$ | 70 | 71.6 | 70 | 73.4 | 74.4 | 70 | 73.4 |
| $B_2O_3$ | 12 | 13.3 | 17 | 13 | 13 | 16 | 13 |
| PbO | 11 | 6.3 | 6 | 6 | 6 | 6 | 6 |
| $Li_2O$ | 0.25 | 0.6 | 0.5 | 0.6 | 0.6 | 0.5 | 1 |
| $K_2O$ | 2.75 | 1.9 | 3 | 2 | 2 | 3 | 2.6 |
| $Na_2O$ | 1 | 1.9 | 0.5 | 2 | 2 | 0.5 | 1 |
| $Al_2O_3$ | 2 | 2 | 2 | 2 | 1 | 2 | 2 |
| $TiO_2$ | | | | | | 1 | |
| $As_2O_3$ | 1 | 1.44 | 1 | 1 | | 1 | 1 |
| $Sb_2O_3$ | | 0.96 | | | 1 | | |
| Softening pt., °C | 757 | 752 | 725 | 750 | 748 | 733 | 742 |
| Softening pt. minus strain pt., °C | 282 | 276 | 254 | 274 | 270 | 268 | 253 |
| Exp. coeff. $\times 10^7$ cm./cm./°C | 36.8 | 36.5 | 37.1 | 37 | 38.3 | 37.4 | 38.0 |
| Chemical durability, loss in weight, mg./sq. cm. | 0.05 | 0.05 | 0.06 | 0.05 | 0.055 | 0.06 | 0.04 |

In each of the above compositions $As_2O_3$ and $Sb_2O_3$ are used as fining agents but may be omitted or substituted by other suitable fining agents, if desired. Composition 9 is particularly suitable for melting in a tank, and composition 11 is particularly suitable for pot melting.

The outstanding feature of the present glasses is their content of $Li_2O$, $K_2O$ and PbO, and the remarkable effect and criticalness of the percentages of these three constituents is demonstrated as follows:

Composition 6 contains only 1.1% $K_2O$. The value for its chemical durability is 0.15 mg. per sq. cm. The value for a similar glass in which the $K_2O$ is substituted by 1.1% $Na_2O$, but which is otherwise identical with composition 6, is 0.58 mg. per sq. cm. This is an increase of 290% in the loss in weight due to the diminished chemical durability.

Composition 3 contains only 0.25% $Li_2O$. The value for its chemical durability is 0.07 mg. per sq. cm. The value for a similar glass in which the $Li_2O$ is substituted by 0.25% $Na_2O$, but which is otherwise identical with composition 3, is more than 0.17 mg. per sq. cm. This represents an increase of more than 140% in loss in weight due to diminished chemical durability.

Composition 6 contains 6% PbO and, as indicated above, the value for its chemical durability is 0.15 mg. per sq. cm. The value for a similar glass in which the PbO is lacking and is substituted by 6% $B_2O_3$ but which is otherwise identical with composition 6 is 0.65 mg. per sq. cm. This represents an increase of 330% in loss in weight due to diminished chemical durability.

I claim:

1. A glass which comprises essentially 68% to 76% $SiO_2$, 10% to 19% $B_2O_3$, 2% to 12% PbO, at least two alkali metal oxides including $Li_2O$ and $K_2O$ in the indicated proportions, selected from the group consisting of 0.1% to 1% $Li_2O$, 1% to 5% $K_2O$ and up to 3% $Na_2O$, and 0.5% to 3% $Al_2O_3$, the sum of which is at least 94% of the total composition, the total percentage of the alkali metal oxides being between 3% and 6%, the total percentage of $B_2O_3$ and PbO being between 15% and 26%, the expansion coefficient of the glass being from $32 \times 10^{-7}$ to $40 \times 10^{-7}$ cm. per cm. per °C. between 0° and 300° C., the softening point being less than 770° C., the difference between the softening point and the strain point being less than 300° C., and the solubility of the glass upon immersion in 5% aqueous HCl at 100° C. for 24 hours after heating for six hours at 510° C. being less than 0.15 mg. per sq. cm.

2. A glass which consists essentially of 68% to 76% $SiO_2$, 10% to 19% $B_2O_3$, 2% to 12% PbO, 0.1% to 1% $Li_2O$, 1% to 5% $K_2O$, up to 3% $Na_2O$, and 0.5% to 3% $Al_2O_3$, the total percentage of the alkali metal oxides being between 3% and 6%, the total percentage of $B_2O_3$ and PbO being between 15% and 26%, the expansion coefficient of the glass being from $32 \times 10^{-7}$ to $40 \times 10^{-7}$ cm. per cm. per °C. between 0° and 300° C., the softening point being less than 770° C., the difference between the softening point and the strain point being less than 300° C., and the solubility of the glass upon immersion in 5% aqueous HCl at 100° C. for 24 hours after heating for six hours at 510° C. being less than 0.15 mg. per sq. cm.

3. A glass which consists approximately of 73.4% $SiO_2$, 13% $B_2O_3$, 6% PbO, 2% $K_2O$, 2% $Na_2O$, 0.6% $Li_2O$, 2% $Al_2O_3$, and 1% $As_2O_3$, on the oxide basis as calculated from the batch.

4. A glass which consists approximately of 71.6% $SiO_2$, 13.3% $B_2O_3$, 6.3% PbO, 1.9% $K_2O$, 1.9% $Na_2O$, 0.6% $Li_2O$, 2% $Al_2O_3$, 1.44% $As_2O_3$, and 0.96% $Sb_2O_3$ on the oxide basis as calculated from the batch.

WILLIAM H. ARMISTEAD.

REFERENCES CITED

The following references are of record in the file of this patent:

UNITED STATES PATENTS

| Number | Name | Date |
|---|---|---|
| 1,449,793 | Taylor | Mar. 27, 1923 |
| 2,282,601 | Blau et al. | May 12, 1942 |
| 2,314,804 | Willson | Mar. 23, 1943 |
| 2,367,871 | Kalsing et al. | Jan. 23, 1945 |
| 2,498,387 | Armistead | Feb. 21, 1950 |

FOREIGN PATENTS

| Number | Country | Date |
|---|---|---|
| 195,495 | Great Britain | 1923 |
| 219,972 | Great Britain | 1925 |
| 753,908 | France | 1933 |
| 533,461 | Great Britain | 1941 |